United States Patent [19]

Levine et al.

[11] Patent Number: 5,991,708
[45] Date of Patent: Nov. 23, 1999

[54] PERFORMANCE MONITOR AND METHOD FOR PERFORMANCE MONITORING WITHIN A DATA PROCESSING SYSTEM

[75] Inventors: Frank Eliot Levine; Charles Philip Roth; Edward Hugh Welbon, all of Austin, Tex.

[73] Assignee: International Business Machines Corporation, Armonk, N.Y.

[21] Appl. No.: 08/888,802

[22] Filed: Jul. 7, 1997

[51] Int. Cl.[6] .................................................. G06F 11/25
[52] U.S. Cl. .......................................... 702/186; 714/39
[58] Field of Search ................................. 702/182, 186; 395/704; 714/25, 30, 39, 47

[56] References Cited

U.S. PATENT DOCUMENTS

| | | |
|---|---|---|
| 3,723,975 | 3/1973 | Kurtz et al. . |
| 3,771,144 | 11/1973 | Belady et al. . |
| 3,818,458 | 6/1974 | Deese . |
| 3,906,454 | 9/1975 | Martin . |
| 4,034,353 | 7/1977 | Denny et al. . |
| 4,068,304 | 1/1978 | Beausoleil et al. . |
| 4,521,849 | 6/1985 | Wilder . |
| 4,590,550 | 5/1986 | Eilert et al. . |
| 4,821,178 | 4/1989 | Levin et al. . |
| 4,905,171 | 2/1990 | Kiel et al. . |
| 5,226,153 | 7/1993 | Deangelis et al. . |
| 5,426,741 | 6/1995 | Butts et al. . |
| 5,440,722 | 8/1995 | Vanderspeck et al. . |
| 5,450,349 | 9/1995 | Brown, III et al. ............... 395/183.03 |
| 5,450,609 | 9/1995 | Schultz et al. . |
| 5,581,482 | 12/1996 | Wiedenman et al. .............. 364/551.01 |
| 5,657,253 | 8/1997 | Dreyer et al. ....................... 364/551.01 |
| 5,691,920 | 11/1997 | Levine et al. ....................... 364/551.01 |
| 5,726,913 | 3/1998 | Grimsrud ............................ 364/551.01 |
| 5,752,062 | 5/1998 | Gover et al. ............................. 355/800 |
| 5,797,019 | 8/1998 | Levine et al. ............................ 395/735 |
| 5,809,450 | 9/1998 | Chrysos et al. ......................... 702/186 |
| 5,835,702 | 11/1998 | Levine et al. ....................... 395/183.15 |
| 5,835,705 | 11/1998 | Larsen et al. ....................... 395/184.01 |
| 5,875,294 | 2/1999 | Roth et al. .......................... 395/183.15 |
| 5,881,223 | 3/1999 | Agrawal et al. .................... 395/184.01 |
| 5,881,306 | 3/1999 | Levine et al. ....................... 395/800.23 |

OTHER PUBLICATIONS

Roth et al., "Performance Monitoring on the PowerPC 604 Microprocessor", IEEE, Apr. 1995.

IBM Technical Disclosure Bulletin, "Event Triggered Performance Monitoring," vol. 37, No. 9, Sep. 1994.

IBM Technical Disclosure Bulletin, "Off Chip L2 Lateral Cache Miss Counting," vol. 37, No. 9, Sept. 1994.

*Primary Examiner*—Patrick Assouad
*Attorney, Agent, or Firm*—Casimer K. Salys; Brian F. Russell; Andrew J. Dillon

[57] ABSTRACT

The present invention provides a performance monitor including a threshold indicator, a granularity indicator, an event detector, and an event counter. The threshold indicator indicates a number of threshold increments, which each correspond to a number of occurrences of a first event. The granularity indicator indicates the number of occurrences of the first event corresponding to each of the threshold increments indicated by the threshold indicator. The granularity indicator has at least a first state and a second state such that the granularity indicator indicates that a first number of occurrences of the first event correspond to a threshold increment in the first state and that a different second number of occurrences of the first event correspond to a threshold increment in the second state. In response to a number of occurrences of the first event detected by the event detector during a selected interval exceeding the number of occurrences indicated by the threshold value and the granularity indicator, the event counter is incremented. In one embodiment, each occurrence of the first event corresponds to a processor clock cycle and the selected interval is defined as the duration of a memory access.

24 Claims, 3 Drawing Sheets

PERFORMANCE MONITOR AND METHOD FOR PERFORMANCE MONITORING WITHIN A DATA PROCESSING SYSTEM

BACKGROUND OF THE INVENTION

1. Technical Field

The present invention relates in general to a data processing system and, in particular, to a method and system for performance monitoring within a data processing system. Still more particularly, the present invention relates to a method and system for performance monitoring that permit selection of a granularity and range when counting occurrences of events subject to a threshold.

2. Description of the Related Art

Within a state-of-the-art processor, facilities are often provided that enable the processor to count occurrences of selected events and thereby obtain a quantitative description of the operation of a data processing system. These facilities are generally referred to as a performance monitor.

A conventional performance monitor includes at least one control register and one or more counters. The control register is typically comprised of a plurality of bit fields, which are set to specified values in order to select the events to be monitored and to specify the conditions under which the counters are enabled. Occurrences of the selected events can then be counted by the performance monitor counters.

Because both the number of events available for monitoring and the number of occurrences of monitored events may be large, it is desirable for performance monitors to employ a large (e.g., 32 or 64-bit) control register and large counters. In addition, because each counter typically records occurrences of only a single specified event, it is desirable to have a large number of counters in order to provide a broad description of data processing system performance. However, because the added functionality provided by a large control register and multiple large counters increases a processor's die size and therefore cost, the size and number of performance monitor control registers and counters are generally somewhat restricted due to economic considerations.

The present invention includes the recognition that, while a performance monitor may have limited control register and/or counter sizes, it is desirable for the performance monitor control register and counters to support large ranges when a large number of event occurrences are to be specified or counted. Similarly, when a fewer number of events are to be specified or counted, it is desirable for the control register and counters to have small granularities. Conventional performance monitors, however, do not provide control registers and counters that support both large ranges and small granularities. Consequently, it would be desirable to provide an improved performance monitor having such capabilities.

SUMMARY OF THE INVENTION

It is therefore one object of the present invention to provide an improved data processing system.

It is another object of the present invention to provide a method and system for performance monitoring within a data processing system.

It is yet another object of the present invention to provide a method and system for performance monitoring that permit selection of a granularity and range when counting occurrences of events subject to a threshold.

The foregoing objects are achieved as is now described. The present invention provides a performance monitor including a threshold indicator, a granularity indicator, an event detector, and an event counter. The threshold indicator indicates a number of threshold increments, which each correspond to a number of occurrences of a first event. The granularity indicator indicates the number of occurrences of the first event corresponding to each of the threshold increments indicated by the threshold indicator. The granularity indicator has at least a first state and a second state such that the granularity indicator indicates that a first number of occurrences of the first event correspond to a threshold increment in the first state and that a different second number of occurrences of the first event correspond to a threshold increment in the second state. In response to a number of occurrences of the first event detected by the event detector during a selected interval exceeding the number of occurrences indicated by the threshold value and the granularity indicator, the event counter is incremented. In one embodiment, each occurrence of the first event corresponds to a processor clock cycle and the selected interval is defined as the duration of a memory access.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
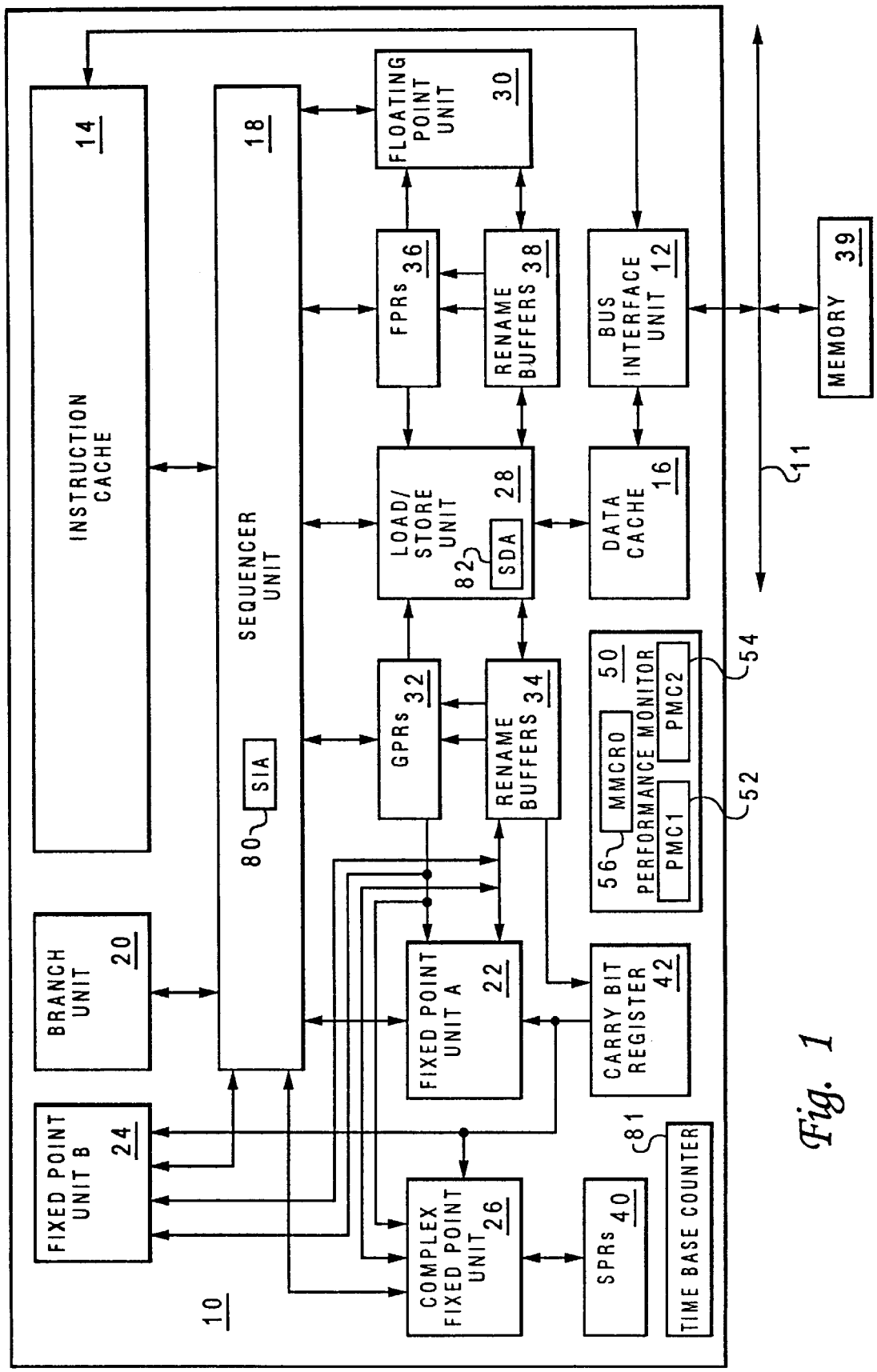
FIG. 1 depicts an illustrative embodiment of a data processing system with which the method and system of the present invention may advantageously be utilized.

With reference now to the figures and in particular with reference to FIG. 1, there is depicted a block diagram of an illustrative embodiment of a processor, indicated generally at 10, in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed from integrated circuitry. Processor 10 preferably comprises one of the PowerPC™ line of microprocessors available from IBM Microelectronics and operates according to reduced instruction set computing (RISC) techniques; however, those skilled in the art will appreciate from the following description that the present invention could alternatively be incorporated within other suitable processors.

As illustrated in FIG. 1, processor 10 is coupled to system bus 11 via bus interface unit (BIU) 12. BIU 12 controls the transfer of information between processor 10 and other devices (e.g., memory 39 or another processor) that are coupled to system bus 11 and that together with processor 10 and system bus 11 form a data processing system. BIU 12 is further connected to instruction cache 14 and data cache 16, which permit processor 10 to achieve relatively fast access times to a small set of local data and instructions stored within caches 14 and 16.

Instruction cache 14 is in turn connected to sequencer unit 18, which fetches instructions from instruction cache 14 for execution. In response to the receipt of instructions from instruction cache 14, sequencer unit 18 selectively dispatches the instructions to the execution units of processor 10, which in the depicted illustrative embodiment include branch unit 20, fixed-point unit A (FXUA) 22, fixed-point unit B (FXUB) 24, complex fixed-point unit (CFXU) 26, load/store unit (LSU) 28, and floating-point unit (FPU) 30. Each execution unit is capable of executing one or more instructions of a particular class of instructions during each cycle. For example, FXUA 22 and FXUB 24 execute a first class of fixed-point instructions that perform mathematical and logical operations such as addition, subtraction, ANDing, ORing, and XORing; CFXU 26 executes a second class of fixed-point instructions that perform operations such as fixed-point multiplication and division; FPU 30 executes floating-point instructions that perform operations such as floating-point multiplication and division; LSU 28 executes load and store instructions; and branch unit 20 executes branch instructions.

Processor 10 achieves high performance by simultaneously processing multiple instructions at a number of pipeline stages within execution units 20–30. In this pipelined architecture, each instruction is processed in a sequence of stages, where processing at each stage is performed in parallel with the processing of other instructions at different stages. In the depicted illustrative embodiment, an instruction is normally processed at six stages: fetch, decode, dispatch, execute, completion, and writeback.

During the fetch stage, sequencer unit 18 selectively fetches one or more instructions from one or more memory addresses within instruction cache 14. An implementation-dependent number of the fetched instructions are then decoded in parallel by sequencer unit 18 during the decode stage.

In the dispatch stage, sequencer unit 18 selectively dispatches up to four decoded instructions to appropriate ones of execution units 20–30 in program order after first reserving entries within rename buffers 34 and 38 for the dispatched instructions' results. During the dispatch stage, operands for the dispatched instructions are also supplied to the selected execution units. For example, FPU 30 can retrieve instruction operands from floating-point registers (FPRs) 36 and floating-point rename buffers 38. Fixed-point execution units 22, 24, and 26, on the other hand, can retrieve instruction operands from general purpose registers (GPRs) 32, fixed-point rename buffers 34, and carry bit register 42. CFXU 26 can also obtain instruction operands from special purpose registers (SPRs) 40 in response to receipt of MFSPR (move from SPR) instruction. LSU 28 retrieves data from a selected one of GPRs 32 and FPRs 36 in response to receipt of a STORE instruction and requests data operands from data cache 16 in response to receipt of a LOAD instruction from sequencer unit 18. If operand data requested from data cache 16 is not resident within data cache 16, the requested data is retrieved from memory 39 (or other external source) via BIU 12 and system bus 11.

In the execute stage, execution units 20–30 opportunistically execute their respective dispatched instructions as operands become available, thereby permitting instructions to be executed out-of-order relative to their program order. The execution results of most instructions are stored in the entry or entries within fixed-point rename buffers 34 and floating-point rename buffers 38 allocated to each instruction by sequencer unit 18. In addition, CFXU 26 stores the execution results of MTSPR (move to SPR) instructions in SPRs 40 or another SPR in processor 10.

In the completion stage, sequencer unit 18 indicates that an instruction is complete. Processor 10 completes instructions in program order. Thereafter, during the writeback stage, sequencer unit 18 directs the copying of data from fixed-point rename buffers 23 to GPRs 22 or from floating-point rename buffers 26 to FPRs 25. It is during the writeback stage that processor 10 updates its architected state in response to the instruction being written back. Processor 10 processes the respective writeback stages of instructions according to program order. Processor 10 advantageously merges an instruction's completion and writeback stages in specified situations. In the illustrative embodiment, each instruction requires one machine cycle to complete each of the stages of instruction processing. Nevertheless, some instructions, such as complex fixed-point instructions, may require more than one cycle. Accordingly, a variable delay may occur between a particular instruction's execution and completion stages in response to the variation in time required for completion of preceding instructions.

Still referring to FIG. 1, the hereinbefore described operation of processor 10 can be monitored utilizing performance monitor 50, which in the illustrative embodiment is a software-accessible mechanism capable of providing detailed information descriptive of the utilization of instruction execution resources and storage control. Although not illustrated in FIG. 1, performance monitor 50 is coupled to each functional unit of processor 10 in order to permit the monitoring of all aspects of the operation of processor 10 including reconstructing the relationship between events, identifying false triggering, identifying performance bottlenecks, monitoring pipeline stalls, monitoring idle cycles, determining dispatch efficiency, determining branch efficiency, determining the performance penalty of misaligned data accesses, identifying the frequency of execution of serialization instructions, identifying inhibited interrupts, and determining performance efficiency. Performance monitor 50 includes an implementation-dependent number (e.g., 2–8) of counters 52–54, labelled PMC1 and PMC2, which are utilized to count occurrences of selected events. Performance monitor 50 further includes at least one monitor mode control register (MMCRO) 56 that specifies the function of counters 52–54. Counters 52–54 and MMCRO 56 are preferably implemented as SPRs that are accessible for read or write via MFSPR (move from SPR) and MTSPR (move to SPR) instructions executable by CFXU 26. However, in an alternative embodiment, counters 52–54 and MMCRO 56 may be implemented simply as addresses in I/O space.

Figure 2:
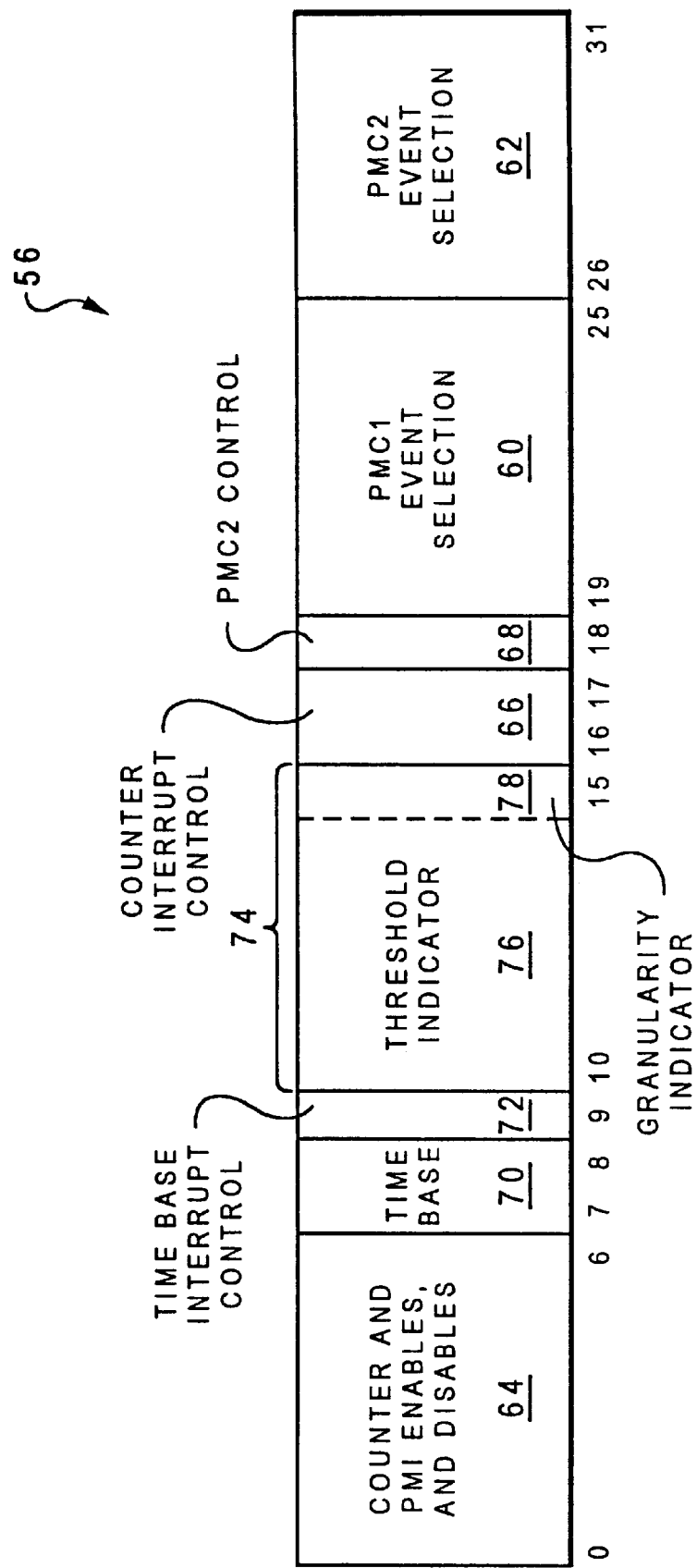
FIG. 2 depicts an illustrative embodiment of the monitor mode control register (MMCR) within the performance monitor illustrated in FIG. 1.

Referring now to FIG. 2, there is illustrated an exemplary embodiment of MMCRO 56 suitable for controlling the operation of two PMC counters 52–54. As depicted, MMCRO 56 is a 32-bit register partitioned into a number of bit fields whose values control the operation of performance monitor 50. Bit fields 60 and 62 are utilized to select the events for which counters 52 and 54 count occurrences. Examples of permissible encodings of bit fields 60–62 and the events they select may be found at pages 9-4 and 9-5 of the *PowerPC*™ 604 *RISC Microprocessor User's Manual* (available from IBM Microelectronics as Order No. MPR604UMU-01), which are incorporated herein by reference. MMCRO 56 further includes bit field 64, which specifies the various conditions under which counting by counters 52–54 is enabled or disabled and whether performance monitor interrupts (PMIs) are enabled or disabled. Bit field 66 specifies whether a PMI is generated when one of PMC1 52 and PMC2 54 go negative. Bit field 68 specifies if counting by PMC2 54 is triggered in response to PMC1 becoming negative or a PMI being signaled. Bit fields 70 and 72 control the operation of time base counter 81 (illustrated in FIG. 1), which comprises a 64-bit counter utilized to time event occurrences in processor 10. Time base counter 81 preferably increments at a frequency based upon the system bus clock, for example, every four clock cycles. Bit field 70 in MMCRO 56 selects which of the 64 bits of time base counter 81 is to be utilized for monitoring, and bit field 72 specifies if a transition of the selected bit generates an interrupt. Time base counter 81 may be utilized, among other things, to synchronize processor operation in a multiprocessor data processing system so that all of the processors detect and react to a selected single system-wide event in a coordinated manner.

Finally, MMCRO 56 includes a 6-bit threshold bit field 74, which specifies a threshold value utilized to identify event occurrences of interest. As illustrated, threshold bit field 74 includes threshold indicator 76, which indicites a number of a occurrences of a first event that must be detected for an occurrence of a second event to be of interest and therefore to be recorded by performance monitor 50. For example, in a case where a line fill of data cache 16 is the event of interest, it is common that only line fills that have a latency of greater than N processor clock cycles are of interest. In that case, threshold value 76 within bit field 74 is set to indicate the value of N (although, as described below, possibly not to the value of N itself).

In accordance with the present invention, threshold bit field 74 further includes a granularity indicator 78 that is set to one of a plurality of possible states to indicate how threshold indicator 76 is interpreted. For example, in an embodiment in which threshold indicator 76 is 5 bits in length and granularity indicator 78 is 1 bit in length, the threshold value N=64 can be represented by setting threshold indicator 76 to 00010b and granularity indicator 78 to 1, where a granularity indicator value of 1 indicates a threshold indicator multiplier of 32 and a granularity indicator value of 0 indicates a threshold indicator multiplier of 1.

Of course, other combinations of threshold indicator and granularity indicator lengths and meanings could alternatively be hardware-implemented or software-selected depending upon threshold granularity and range requirements. For example, the threshold indicator could include 4 bits and the granularity indicator could include 2 bits. Alternatively, the threshold indicator could utilize the full length of threshold bit field 74 and the granularity indicator could reside in another hardware register. In addition, the state of the granularity indicator could be chosen to indicate both a threshold indicator offset and a threshold indicator multiplier. In this embodiment, a granularity indicator value of 1 could mean, for example, that the threshold value is determined by multiplying the threshold indicator value by 8 and adding a threshold indicator offset of 32. Another possible embodiment is that each state of the granularity indicator could be selected to represent an exponentially greater threshold indicator multiplier such that the four possible states of a 2-bit granularity indicator represent threshold indicator multipliers of 2, 4, 8, and 16, respectively.

Figure 3:
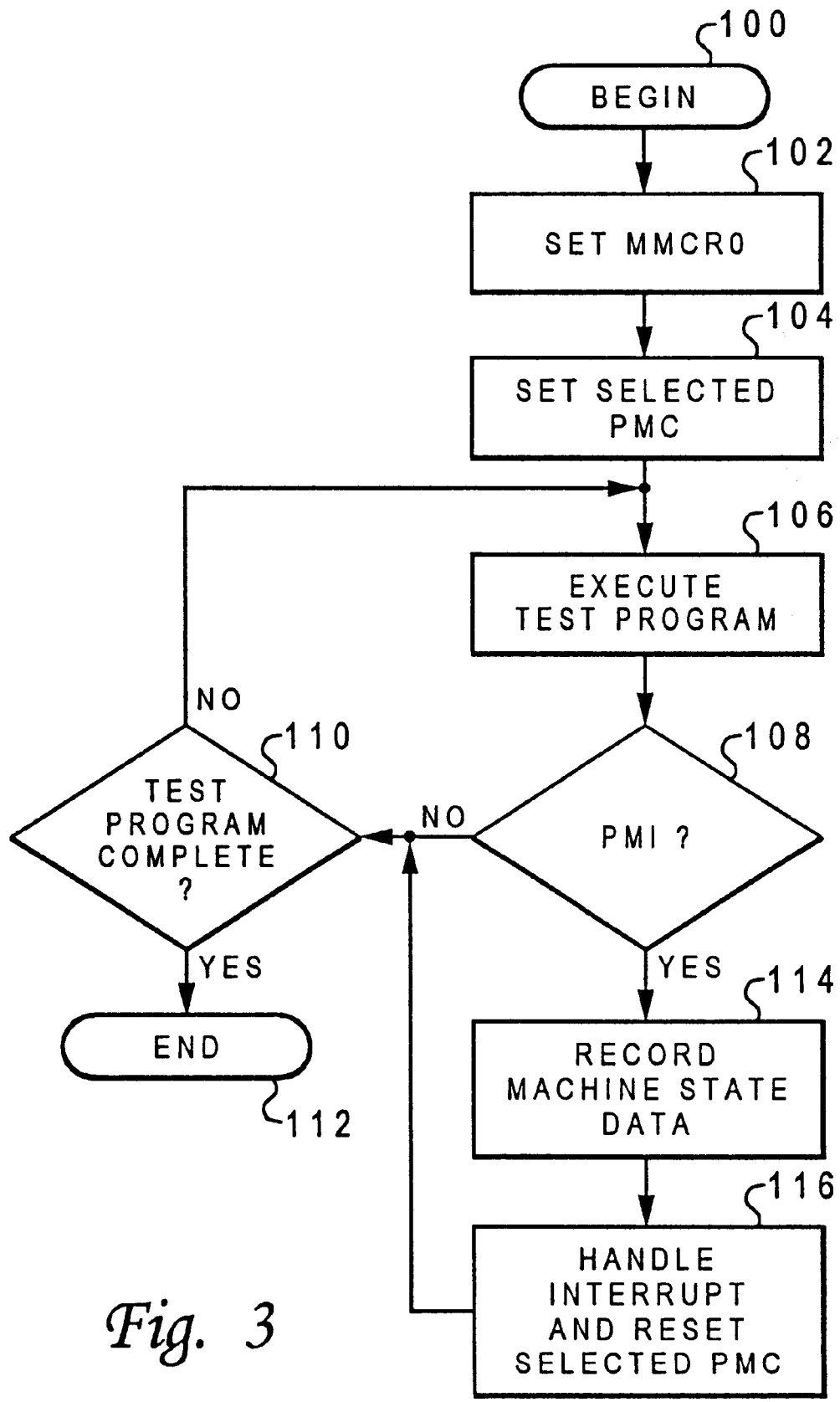
FIG. 3 is a logical flowchart of an illustrative embodiment of a method of performance monitoring in accordance with the present invention.

With reference now to FIG. 3, there is depicted a flowchart of an illustrative embodiment of a process by which the thresholding capabilities of performance monitor 50 can be utilized to monitor an event of interest. The process will be described with reference to an embodiment of MMCRO 56 in which threshold indicator 76 is 5 bits in length and granularity indicator 78 is 1 bit in length. Although in the following example, the event of interest is selected to be high latency data cache line fills, it should be understood that another event (e.g., a floating-point divide instruction) could alternatively be selected.

As illustrated, the process begins at block 100 and thereafter proceeds to block 102, which illustrates the execution of a MTSPR instruction in order to load a selected value into MMCRO 56. In one possible implementation, bit field 64 of MMCRO 56 is set to enable counting by PMC2 54, and bit field 62 is set to select data cache line fills as the event for which occurrences are counted by PMC2 54. In order to ensure that only high latency (e.g., greater than 64 cycles) data cache line fills are recorded by PMC2 54, threshold indicator 76 is set to 00010b and granularity indicator 78 is set to 1 to specify a threshold indicator multiplier of 32. In addition, bit field 66 is set so that a PMI is signalled in response to PMC2 54 becoming negative. The process then proceeds from block 102 to block 104, which depicts setting PMC2 54 to an initial value through the execution of a second MTSPR instruction having PMC2 54 as a target. In this way, the number of high latency data cache line fills that are detected prior to performance monitor 50 signalling a PMI may be selectively determined. For example, if data descriptive of each high latency data cache line fill is desired, PMC2 54 is initialized to EFFFFFFFh. On the other hand, if data descriptive of only one out of every 16 high latency data cache line fills is desired, PMC2 54 is initialized to EFFFFFFFlh. Following block 104, the process proceeds to block 106.

Block 106 illustrates the execution of a test program in the manner described above with reference to FIG. 1. As execution begins, performance monitor 50 loads a shadow register in processor 10 with the number of processor cycles indicated by the threshold value indicated by threshold indicator 76 and granularity indicator 78 (i.e., 64). Then, in response to a miss in data cache 16 and the issuing of a data request to memory 39, the shadow register is decremented once for each processor clock cycle that elapses prior to the requested data being loaded into data cache 16. If the value of the shadow register reaches 0 before the requested data is loaded into data cache 16, PMC2 54 is incremented. The shadow register is reset to the threshold value following the completion of the line fill.

As indicated by blocks 108 and 110, if a PMI is not signalled prior to the completion of the test program, the process terminates at block 112. However, if a PMI is signalled, data describing the machine state of processor 10 is recorded for subsequent compilation and analysis. In order to ensure that there is no loss of data due to interrupt masking, when the PMI is signaled processor 10 captures the effective instruction address and operand address (if any) of "a" current instruction within saved instruction Address (SIA) register 80 and saved data address (SDA) register 82, respectively. The states of the various execution units are also saved, preferably in one or more saved state registers (SSRs) that are either internal registers or software-accessible SPRs. Thus, regardless of when the PMI is actually serviced, the content of SIA register 80, SDA register 82, and the SSRs provide information describing the instructions executing in processor 10 at the time of the PMI was signalled. The process then proceeds from block 114 to block 116, which depicts processor 10 servicing the PMI by executing an interrupt handler that preferably resets PMC2 54. Thereafter, the process passes to block 110, which has been described. Following the termination of the test program, the recorded machine state data can be compiled and analyzed in order to optimize data processing system performance.

As has been described, the present invention provides an improved method and system for performance monitoring in a data processing system. The present invention supports both enhanced thresholding range and granularity while maintaining an economical use of bit space within a performance monitor control register. While the invention has been particularly shown and described with reference to a preferred embodiment, it will be understood by those skilled in the art that various changes in form and detail may be made therein without departing from the spirit and scope of the invention. For example, greater flexibility in tailoring a thresholding analysis of processor performance could be provided by permitting selection of the thresholding event. Thus, while the embodiment of processor 10 illustrated in FIG. 1 and 2 only utilizes processor cycles as the thresholding event, alternative embodiments could permit software selection of the thresholding event from among other events (e.g., bus cycles) monitored by performance monitor 50.

What is claimed is:

1. A performance monitor, comprising:
a threshold indicator which indicates a number of threshold increments, each of said threshold increments corresponding to a number of occurrences of a first event;
a granularity indicator which indicates the number of occurrences of said first event corresponding to each of said threshold increments, said granularity indicator having at least a first state and a second state, wherein said granularity indicator indicates that a first number of occurrences of said first event correspond to a threshold increment in said first state and that a different second number of occurrences of said first event correspond to a threshold increment in said second state;
an event detector which detects occurrences of said first event; and
an event counter that is incremented in response to a number of occurrences of said first event detected during a selected interval exceeding the number of occurrences indicated by said threshold value and said granularity indicator.

2. The performance monitor of claim 1, and further including a control register, said threshold indicator comprising selected bits within said control register.

3. The performance monitor of claim 1, said granularity indicator having a third state in which said granularity indicator indicates that a third number of occurrences of said first event correspond to a threshold increment, wherein said third number is exponentially greater than said second number and said second number is exponentially greater than said first number.

4. The performance monitor of claim 1, wherein each increment of a count value of said event counter corresponding to an occurrence of a second event and wherein said selected interval is bounded by an occurrence of a third event and an occurrence of a fourth event.

5. The performance monitor of claim 4, wherein said occurrence of said third event comprises initiation of a memory access and said fourth event comprises completion of said memory access.

6. The performance monitor of claim 4, wherein said occurrence of said third event comprises initiation of execution of an instruction and said fourth event comprises completion of execution of said instruction.

7. The performance monitor of claim 1, an occurrence of said first event comprising a processor clock cycle.

8. The performance monitor of claim 1, an occurrence of said first event comprising a bus clock cycle.

9. A data processing system, comprising:
a memory;
at least one execution unit; and
a performance monitor, including:
a threshold indicator which indicates a number of threshold increments, each of said threshold increments corresponding to a number of occurrences of a first event;
a granularity indicator which indicates the number of occurrences of said first event corresponding to each of said threshold increments, said granularity indicator having at least a first state and a second state, wherein said granularity indicator indicates that a first number of occurrences of said first event correspond to a threshold increment in said first state and that a different second number of occurrences of said first event correspond to a threshold increment in said second state;
an event detector which detects occurrences of said first event; and
an event counter that is incremented in response to a number of occurrences of said first event detected during a selected interval exceeding the number of occurrences indicated by said threshold value and said granularity indicator.

10. The data processing system of claim 9, and further including a control register, said threshold indicator comprising selected bits within said control register.

11. The data processing system of claim 9, said granularity indicator having a third state in which said granularity indicator indicates that a third number of occurrences of said first event correspond to a threshold increment, wherein said third number is exponentially greater than said second number and said second number is exponentially greater than said first number.

12. The data processing system of claim 9, wherein each increment of a count value of said event counter corresponds to an occurrence of a second event and wherein said selected interval is bounded by an occurrence of a third event and an occurrence of a fourth event.

13. The data processing system of claim 12, wherein said occurrence of said third event comprises initiation of a memory access and said fourth event comprises completion of said memory access.

14. The data processing system of claim 12, wherein said occurrence of said third event comprises initiation of execution of an instruction and said fourth event comprises completion of execution of said instruction.

15. The data processing system of claim 9, and further including a processor clock, wherein an occurrence of said first event comprises a processor clock cycle.

16. The data processing system of claim 9, said data processing system being connectable to bus, wherein an occurrence of said first event comprises a clock cycle of said bus.

17. A method of performance monitoring, comprising:
setting a threshold indicator to indicate a number of threshold increments, each of said threshold increments corresponding to a number of occurrences of a first event;

setting a granularity indicator to indicate the number of occurrences of said first event corresponding to each of said threshold increments, said granularity indicator having at least a first state and a second state, wherein said granularity indicator indicates that a first number of occurrences of said first event correspond to a threshold increment in said first state and that a different second number of occurrences of said first event correspond to a threshold increment in said second state;

detecting occurrences of said first event; and incrementing an event counter in response to a number of occurrences of said first event detected during a selected interval exceeding the number of occurrences indicated by said threshold value and said granularity indicator.

18. The method of claim 17, said step of setting a threshold indicator comprising the step of setting selected bits within a control register.

19. The method of claim 17, said granularity indicator having a third state in which said granularity indicator indicates that a third number of occurrences of said first event correspond to a threshold increment, wherein said third number is exponentially greater than said second number and said second number is exponentially greater than said first number, wherein said step of setting said granularity indicating comprises the step of setting said granularity indicator to one of said first, second, and third states.

20. The method of claim 19, a count value of said event counter corresponding to an occurrence of a second event, wherein said incrementing step comprises the step of incrementing said count value in response to the number of occurrences of said first event detected during between an occurrence of a third event and an occurrence of a fourth event exceeding the number of occurrences indicated by said threshold value and said granularity indicator.

21. The method of claim 20, wherein said occurrence of said third event comprises initiation of a memory access and said fourth event comprises completion of said memory access.

22. The method of claim 20, wherein said occurrence of said third event comprises initiation of execution of an instruction and said fourth event comprises completion of execution of said instruction.

23. The method of claim 17, said detecting step comprising detecting each clock cycle of a processor.

24. The method of claim 17, said detecting step comprising detecting each clock cycle of a bus.

* * * * *